United States Patent [19]

Wu et al.

[11] Patent Number: 5,460,872
[45] Date of Patent: Oct. 24, 1995

[54] PROCESS FOR COATING MICROPOROUS SUBSTRATES AND PRODUCTS THEREFROM

[75] Inventors: Huey S. Wu; Eric W. Kaler, both of Newark, Del.

[73] Assignee: W. L. Gore & Associates, Inc., Newark, Del.

[21] Appl. No.: 289,165

[22] Filed: Aug. 11, 1994

Related U.S. Application Data

[60] Continuation-in-part of Ser. No. 220,133, Mar. 30, 1994, Pat. No. 5,376,441, which is a division of Ser. No. 38,573, Mar. 26, 1993, abandoned.

[51] Int. Cl.$^6$ ........................................ B32B 3/26
[52] U.S. Cl. ........................................ 428/304.4; 428/339
[58] Field of Search ........................................ 428/304.4, 339

[56] References Cited

U.S. PATENT DOCUMENTS

| | | |
|---|---|---|
| 4,566,981 | 1/1986 | Howells . |
| 4,668,726 | 5/1987 | Howells . |
| 4,722,904 | 9/1989 | Feil . |
| 4,864,006 | 9/1989 | Giannetti et al. . |
| 4,914,146 | 4/1990 | Harada et al. . |
| 4,975,468 | 12/1990 | Yiv . |
| 4,985,282 | 1/1991 | Moggi et al. . |
| 5,077,097 | 12/1991 | Moggi et al. . |
| 5,151,217 | 9/1992 | Price . |
| 5,234,751 | 8/1993 | Harada et al. ............ 428/304.4 |
| 5,234,807 | 8/1993 | Texter . |
| 5,376,441 | 12/1994 | Wu et al. . |

FOREIGN PATENT DOCUMENTS

| | | |
|---|---|---|
| 182516 | 5/1986 | European Pat. Off. . |
| 0193963 | 9/1986 | European Pat. Off. . |
| 0280312 | 8/1988 | European Pat. Off. . |
| 0315078 | 5/1989 | European Pat. Off. . |
| 0315841 | 5/1989 | European Pat. Off. . |
| 2515198 | 10/1981 | France . |
| 63-296940 | 12/1988 | Japan ............ 428/304.4 |
| 63-296939 | 12/1988 | Japan ............ 428/304.4 |
| 03109410 | 5/1991 | Japan . |
| 6510472 | 2/1966 | Netherlands . |
| 1237673 | 5/1984 | U.S.S.R. . |
| 9308019 | 4/1993 | WIPO ............ 428/304.4 |

OTHER PUBLICATIONS

Macromolecules, Polym. of Tetrahydrofurfuryl Methacrylate in Three–Component Anionic Microemulsions, Full, et al, 1992.

Chemical Abstracts, vol. 115, No. 22, 2 Dec. 1991, Columbus, Ohio Abstract No. 233147, "Acrylic Resin Aqueous Emulsions with good Dispersion Stability" and Abstract of JP A,03 109 410 (Nitto Denko Corp.) 9 May 1991.

*Primary Examiner*—Joseph L. Schofer
*Assistant Examiner*—N. Sarofim
*Attorney, Agent, or Firm*—Gary A. Samuels

[57] ABSTRACT

In this invention an aqueous colloidal dispersion of submicron size polymer particles is used to coat the internal structure that defines the pores of microporous substrates.

4 Claims, No Drawings

PROCESS FOR COATING MICROPOROUS SUBSTRATES AND PRODUCTS THEREFROM

CROSS REFERENCE TO RELATED APPLICATIONS

This application is a continuation-in-part of application Ser. No. 08/220,133 filed Mar. 30, 1994 now U.S. Pat. No. 5,376,411 which is a divisional application Ser. No. 08/038,573 filed Mar. 26, 1993 now abandoned.

FIELD OF THE INVENTION

This invention relates to microporous materials having the pores coated with submicron polymeric particles.

BACKGROUND OF THE INVENTION

Microemulsions are known in the art. They are stable isotropic mixtures of oil, water, and surfactant. Other components, such as salt or a co-surfactant (an alcohol, amine, or other amphiphilic molecule) may also be part of the microemulsion formulation. The oil and water reside in distinct domains separated by an interfacial layer rich in surfactant. Because the domains of oil or water are small, microemulsions appear visually transparent or translucent, and are not birefringent. Unlike emulsions, microemulsions are equilibrium phases and form spontaneously upon contact of the ingredients.

Microemulsions can have a variety of microstructures, depending mainly on composition and temperature. The common structural feature is the presence of a surfactant-rich sheet separating oil-rich and water-rich domains. There are three most common structures. One is the so-called water-in-oil microemulsions, in which water is contained inside distinct domains (droplets) in a continuous oil-rich domain. A second is oil-in-water microemulsions in which oil is contained inside distinct domains in a continuous water-rich domain. The third is bicontinuous microemulsions in which there are sample-spanning intertwined paths of both oil and water, separated from each other by the surfactant-rich film (a sponge-like structure).

In contrast to bulk and solution polymerization, high reaction rates, high conversions and large molecular weights are achieved using either emulsion or microemulsion polymerization of unsaturated hydrocarbons, which are considered to be oils. In both cases the high rates and conversions and large molecular weights are thought to be obtained because the monomer molecules are concentrated in a number of small regions or domains of the microemulsion, which facilitates reaction among themselves. A microemulsion can be distinguished from a conventional emulsion by its optical clarity, low viscosity, small domain size, thermodynamic stability, and spontaneous formation. Microemulsion polymerization has several advantages over traditional emulsion polymerization. First, emulsions are turbid and opaque, while microemulsions are usually transparent or translucent and so are particularly suitable for photochemical reactions. Second, microemulsion polymerization enables preparation of stable, monodisperse microlatexes containing particles smaller than those produced with classical emulsion polymerization processes. Finally, the structural diversity of microemulsions (droplet and bicontinuous) is set by thermodynamics, and rapid polymerization may be able to capture some of the original structure.

Modification of porous substrates by coating them with fluorinated polymers is known in the literature, thus, porous substrates can be coated with water-repellant polymers in order to increase their hydrophobicity. However, such processes normally require expensive and/or environmental-hazardous fluorinated solvents, such as CFCs. Moreover, water-based emulsion polymerization of fluorinated monomers usually yields particles with sizes in the range of 0.1–10 micron, which makes it difficult to give uniform coatings on substrates having submicron pore structures. In addition, such large particle sizes result in coatings that can clog the pores of micron or submicron pore structures, which is detrimental in many applications.

It would be desirable, therefore, to provide polymeric colloidal dispersions of very small particle sizes made from the monomer microemulsions in order to coat porous substrates in which the pores are micropores.

SUMMARY OF THE INVENTION

In this invention an aqueous colloidal dispersion of submicron size polymer particles is used to coat the internal structure that defines the pores of microporous substrates. The microporous substrates are polymeric materials having very small pores from one side to the other, such as porous polytetrafluoroethylene, porous polyethylene, porous polypropylene.

The polymer particles in the dispersion have an average size of about 0.01–0.1 micrometers.

DETAILED DESCRIPTION OF THE INVENTION

In the invention, microporous substrates are coated on the interior of the pores with a coating formed from submicron organic polymer particles applied from a colloidal dispersion of the particles. Since the polymer particles are submicron size, they are easily imbibed into the porous microstructure of the microporus substrates.

The polymer particles will impart their properties to the substrate and can be used to achieve desired properties in the microporous substrates. For example, oleophobicity and hydrophobicity can be provided to the substrate by imbibing polymer particles of fluoroalkyl acrylates or methacrylates to form a coating on the pore interior. Polymer particles of alkylacrylates or methacrylates impart hydrophobicity. Polymer particles of acrylonitriles, vinyl acetates and other functionalized acrylates and methacrylates can provide either hydrophilicity and oleophilicity or can provide the opposite (hydrophobicity or oleophobicity) depending on the functional groups employed.

By using polymer particle coatings made from polymerization of microemulsions of monomers, the particles will have a very high molecular weight (greater than $1 \times 10^5$). This results in coatings of good durability because the high molecular weight renders the polymers less susceptible to dissolving organic solvents. The small particle size also aids in formation of uniform coatings on the pore interior.

In addition, the coating dispersion is a water-base dispersion and thus, being solvent free, is environmentally acceptable.

The preparation of the polymeric particles depends on careful selection of the ingredients of the monomeric microemulsion from which the polymers are made. The monomeric microemulsions are prepared by mixing water, unsaturated organic monomers, fluorosurfactants, and optionally, co-solvents or inorganic salts. The amounts employed are 1–40 weight percent, preferably 5–15, organic monomer; 1–40 weight percent, preferably 1–25, of the surfactant; with the remainder water.

To make the polymerized colloidal dispersions in a single batch process using the microemulsion described above, the temperature of the monomeric microemulsion is adjusted to between 5° and 100° C., preferably 5°–80° C., and a free radical producing polymerization initiator added. Preferred initiators include persulfates, azo initiators, for example 2,2-azobis (2-amidopropane) dihydrochloride; peroxides, or photo initiators such as ultraviolet initiators and gamma ray initiators. Amounts of initiators present can range from 0.01 to 10 percent by weight based on monomer content. Cosolvents such as an alcohol, amines or other amphophilic molecules, or salt can be employed if desired to facilitate formation of the microemulsion.

Introduction of the initiator causes polymerization of the monomer to begin and the reaction proceeds. The resulting colloidal polymer particles have an average particle size of between 0.003 to 0.1 micrometer, preferably 0.003 to 0.04, and a polymer average molecular weight of over 10,000, preferably over 20,000 or 50,000. The unusually small particle size provides a polymer system with a number of advantages over systems containing larger particles. The system is a colloidal dispersion and is usually clear rather than turbid. The small particle size aids in producing coatings of uniform thickness and maintains good gas permeability of porous substrates. When the polymer is fluorinated, the fluorinated nature of the pendant groups in the polymer chain aids in increasing the hydrophobicity and oleophobicity of substrates to which the polymer is applied.

The polymers so produced can be applied to a substrate directly from the colloidal dispersion by immersing the substrate material into the dispersion, or by painting the substrate with the dispersion, or by spraying the dispersion onto the substrate. Suitable substrates include microporous polymeric membranes of any form including sheets or tubes.

Once the polymer particles are applied to the substrate, any water, surfactant or initiator remaining can be drawn off by any convenient means, such as heating, steam stripping, vacuum evaporation or the like.

The resulting product is a coated microporous substrate with the coating present as a coating on the internal structure of the substrate that makes up the pores. A particularly preferred substrate is a microporous polytetrafluoroethylene made by stretching polytetrafluoroethylene tape or film as described in Gore U.S. Pat. No. 3,953,566. In this procedure the structure comprises an interconnected network of nodes and fibrils interconnecting the nodes, the nodes and fibrils comprising the internal structure that defines the pores.

The resulting coated articles provide gas permeable articles of enhanced properties depending on the nature of the polymer. This makes them useful as gas filters, vent filters and as insulation for electrical wiring. In addition, thin, flexible porous films and membranes are useful in garment constructions where oil and water repellancy is desired.

Representative monomers that are useful in making the polymeric particle dispersions include acrylates, methacrylates, styrene, acrylonitriles, vinyls, allyls or alkenes and the like. Preferably, the monomers will be fluorinated. Representative monomers include:

acrylates: alkyl acrylates, fluoroalkyl acrylates, chloroalky acrylates, bromoalkyl acrylates, and the like, of less than 20 carbons, methacrylates: alkyl methacrylates, fluoroalkyl methacrylates, chloroalkyl methacrylates, bromoalkyl methacrylates, and the like, of less than 20 carbons, styrene and substituted styrenes: styrene, methylstyrene, fluorostyrene, chlorostyrene, bromostyrene, and the like, acrylonitriles: acrylonitrile, methacrylonitrile, and the like, vinyls: vinyl acetate, vinylidene chloride, alkyl vinyl ether, fluoroalkyl vinyl ether, and the like, allyl compounds: allyl acetate, allyl chloride, allyl bromide, and the like, alkenes: hydrocarbons, fluorocarbons, chlorocarbons, or bromocarbons with carbon atom content number per molecule at least 4, and less than 20 carbons, such as hexene, heptene, octene, decene, fluorohexene, fluoroheptene, fluorooctene, fluorodecene, and the like.

Representative perfluoroalkyl-containing monomers include fluoroalkyl acrylates and fluoroalkyl methacrylates of the formula

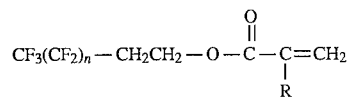

wherein n is a cardinal number of 3–13 and R is H or CH$_3$; fluoroalkyl aryl urethanes, for example

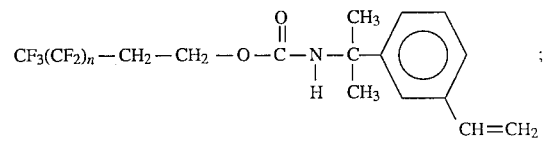

fluoroalkyl allyl urethanes, for example

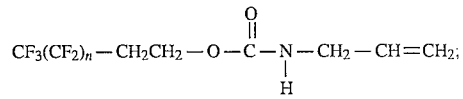

fluoroalkyl maleic acid esters, for example

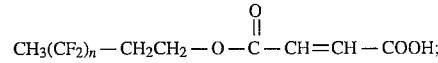

fluoroalkyl urethane acrylates; fluoroalkyl acrylamides; fluoroalkyl sulfonamide acrylates and the like. Preferably the fluorinated alkyl moieties will have 6–16 carbon atoms and most preferably 6–12 carbon atoms.

The fluorinated surfactants used have the general formula

where R$_f$ is a perfluoroalkyl group or a perfluoroalkylether group with carbon number from 1 to 15 and preferably from 6 to 9 and R is for example an alkylene group or an alkylene thioether (—CH$_2$—S—CH$_2$—) linkage with carbon number from 0 to 4. For fluorinated anionic surfactants, Y is for example a carboxylate group (COO—), sulfonic group (SO$_3$—), or sulfate group (SO$_4$—) and X is an alkaline metal ion or ammonium ion. For fluorinated nonionic surfactants, Y is for example an oxyethylene (OCH$_2$CH$_2$)$_m$ linkage where m is an integer from 1 to 15 and preferably from 3 to 9 and X is a hydroxyl group. For fluorinated cationic surfactants, YX is for example a quaternary ammonium salt.

TEST PROCEDURES

Particle Size Determination

Quasielastic light scattering was used to determine particle size. Microemulsion samples obtained as described in the examples were diluted with water to 100 times the original volume to eliminate interparticle interactions. Quasielastic light scattering cumulant functions were measured at 25° C. with a Brookhaven Model 9000AT goniometer and correlator at a scattering angle of 90°. Correlation functions were fit to a two term cumulant expression to determine the apparent diffusion coefficient, which was assumed to correspond to the reported particle size via the Stokes-Einstein relation. The solvent viscosity was assumed to be that of water.

Molecular Weight

Molecular weight was determined after precipitating and washing the polymer with acetone. The washed polymer was dissolved in Fluorinert® FC-75 at 50° C. Molecular weight and polymer concentration were determined at room temperature using a Viscotek Model 600 RALLS and differential refractometer operating at a wavelength of 0.67 micrometer. The Viscotek Model 600 RALLS instrument records the light scattered intensity at a scattering angle of 90°, and this value is related to polymer molecular weight using the principles of classical light scattering.

Air Permeability—Gurley Number Test

Gurley numbers were obtained as follows:

The resistance of samples to air flow was measured by a Gurley densometer (ASTM D726-58) manufactured by W. & L. E. Gurley & Sons. The results are reported in terms of Gurley Number which is the time in seconds for 100 cubic centimeters of air to pass through 1 square inch of a test sample at a pressure drop of 4.88 inches of water.

Water Repellency: Spray Test

The Spray Test was carried out by AATCC Test Method 22-1985. The higher the number the more water repellant.

Oil and Fluid Repellency Test

In these tests, oil rating was carried out by AATCC Test Method 118-1983. The higher the number, the better the oil repellency.

EXAMPLES A THROUGH D—PREPARATION OF POLYMERIC COLLOIDAL DISPERSION

Example A

In a 100 milliliter glass reactor, 10 gram of fluoroacrylate, namely,

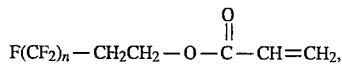

(from Du Pont, trade name Zonyl TA-N), 15 gram of ammonium perfluorooctanoate, and 70 gram of distilled water were charged and heated to 70° C. with stirring. A clear microemulsion with a light green color formed. Then, 0.1 gram of potassium persulfate in 5 gram of distilled water was charged into the reactor to initiate polymerization. Polymerization proceeded for about one hour at 70° C. At that time the mixture was cooled to room temperature. A clear colloidal dispersion was produced which was stable for at least 24 hours at room temperature. The average particle size of the dispersion particles was determined to be about 0.03 micrometer by quasielastic light scattering. The weight average molecular weight of the polymer produced was determined to be above 1,000,000 by classical light scattering techniques.

Example B

In a 100 milliliter glass reactor, 10 gram of fluoromethacrylate (from Du Pont, trade name Zonyl TM), 20 gram of ammonium perfluorooctanoate, and 65 gram of distilled water were charged and heated to 75° C. with stirring. A clear microemulsion with a light green color formed. Then, 0.1 gram of ammonium persulfate in 5 gram of distilled water was charged into the reactor to initiate polymerization. Polymerization proceeded for about one hour at 75° C. at which time the mixture was allowed to cool to room temperature. A clear dispersion was produced which was stable for at least 24 hours at room temperature. The average particle size of the particles in the dispersion was determined to be about 0.03 micrometer by quasielastic light scattering. The weight average molecular weight was determined to be over 1,000,000 by classical light scattering techniques.

Example C

In a 100 milliliter glass reactor, 9 gram of fluoroacrylate (from Du Pont, trade name Zonyl TA-N), 1 gram of styrene (from Aldrich), 15 gram of ammonium perfluorooctanoate, and 70 gram of distilled water were charged and heated to 70° C. with stirring. A clear microemulsion with a light green color formed. The, 0.3 gram of a cationic initiator (from Wako, trade name V-50) in 5 gram of distilled water was charged into the reactor to initiate polymerization. Polymerization proceeded for about one hour at 70° C. at which time the mixture was cooled to room temperature. A translucent dispersion was produced and was stable for at least 24 hours at room temperature.

Example D (A) A mixture of fluorinated monomer and a hydrogenated crosslinking agent:

In a one liter glass reactor, 58 gram of fluoromethacrylate (from Du Pont, trade name Zonyl TM), 2 gram of allylglycidyl ether (from Aldrich), 120 gram of ammonium perfluorooctanoate and 480 gram of distilled water were charged and heated to 75° C. with stirring. A clear microemulsion formed. Then, 0.3 gram of a cationic initiator (from Wako, trade name V-50) in 10 gram of distilled water was charged into the reactor to initiate polymerization. Polymerization proceeded for about two hours at 75° C. A transparent dispersion was produced and on cooling was stable for at least 24 hours at room temperature.

(B) A mixture of fluorinated monomer and a fluorinated crosslinking agent:

In another one liter glass reactor, 57 gram of fluoromethacrylate (from Du Pont, trade name Zonyl TM), 3 gram of perfluoroalkyl maleic acid ester (from a reaction product of equal molar amount of perfluoroalkyl ethyl alcohol, trade name Zonyl BA-N from Du Pont, and maleic anhydride at 110° C. for two hours), 120 gram of ammonium perfluorooctanoate and 480 gram of distilled water were charged and heated to 75° C. with stirring. A clear microemulsion formed. Then, 0.3 gram of a cationic initiator (from Wako, trade name V-50) in 10 gram of distilled water was charged into the reactor to initiate polymerization. Polymerization proceeded for about two hours at 75° C. A transparent dispersion was produced and on cooling was stable for at least 24 hours at room temperature.

COATING SUBSTRATES

Example 1

The dispersion produced in Example A was used to coat a piece of expanded microporous polytetrafluoroethylene (PTFE) membrane provided by W. L. Gore & Associates, Inc. The coating procedure was to dip the substrate into the dispersion and let excess fluid drip off. Then the coated substrates were placed in an oven at 225° C. for 3 minutes. During the drying process, water and the fluorinated surfactant were removed from the substrate and the fluorinated polymer melted and flowed on the surface of the substrates. When cooled to room temperature, the substrate was tested for water repellency, oil repellency and air permeability. For the expanded PTFE membrane, the untreated sample had an oil rating of 1 and a Gurley number of 11 seconds, while the treated sample had an oil rating of 8 and Gurley number of 14 seconds.

Example 2

Equal amounts of the dispersion produced from Example D(A) and D(B) were mixed and used to coat the substrate as described in Example 1. The coating procedure was the same as in Example 1. The treated sample was evaluated and the results are given below.

For the expanded PTFE membrane, the untreated sample had an oil rating of 1 and a Gurley number of 11 seconds, while the treated sample had an oil rating of 8 and Gurley number of 14 seconds.

Example 3

The dispersion produced in Example B was coagulated by adding an equal volume of acetone. The polymer precipitated and was washed several times with acetone to remove surfactant from the polymer. The polymer then was air dried at room temperature for 48 hours. It was a fine white powder. The powder was found to dissolve in fluorinated solvents such as Fluorinert® obtained from 3M Company. The solubility of the fluoromethacrylate polymer is at least 1 weight % in either Fluorinert FC-77, FC-75, or FC-40 at 40° C.

The 1 weight % polymer in FC-75 solution was used to coat the substrate used in Example 1. The coating procedure was the same as in Example 1 except the oven temperature was 150° C. for 1 minute. The treated sample was evaluated and the results are given below.

For the expanded PTFE membrane, the untreated sample had an oil rating of 1 and a Gurley number of 11 seconds, while the treated sample had an oil rating of 7 and a Gurley number of 13 seconds.

We claim:

1. Process for impregnating submicron organic polymer particles into the pores of a microporous substrate, which comprises subjecting the substrate to an aqueous colloidal dispersion of submicron size organic polymer particles, and then drying the substrate.

2. Process of claim 1 in which the organic polymer particles are made from monomers selected from the class consisting of alkyl acrylates, alkyl methacrylates, acrylonitriles, vinyls, styrene, substituted styrene, allyls and alkenes.

3. Process of claim 1 in which the organic polymer particles are selected from fluoroalkylacrylates or perfluoroalkylmethacrylates.

4. Process of claim 1 wherein the microporous substrate is polytetrafluoroethylene.

* * * * *